United States Patent [19]

Prudhon et al.

[11] Patent Number: 4,595,579
[45] Date of Patent: Jun. 17, 1986

[54] PROCESS FOR INITIATING A REACTION FOR THE MANUFACTURE OF SYNTHETIC HYDROCHLORIC ACID

[75] Inventors: Francois Prudhon, Versailles; Patrick Mangin, Grenoble, both of France

[73] Assignee: Vicarb S.A., Saint Martin d'Heres, France

[21] Appl. No.: 700,739

[22] Filed: Feb. 12, 1985

[30] Foreign Application Priority Data

Feb. 24, 1984 [FR] France ............................. 84 03086

[51] Int. Cl.$^4$ ................................................ C01B 7/01
[52] U.S. Cl. ............................. 423/487; 204/157.41; 204/DIG. 11; 423/DIG. 9; 204/157.48
[58] Field of Search ........ 423/487, DIG. 9, DIG. 10; 156/DIG. 80; 204/DIG. 11, 157.1 R

[56] References Cited

U.S. PATENT DOCUMENTS

| | | | |
|---|---|---|---|
| 4,012,301 | 3/1977 | Rich et al. | 204/157 R |
| 4,147,602 | 4/1979 | Garbuny | 204/157.1 R |
| 4,176,024 | 11/1979 | Garbuny | 204/157.1 R |
| 4,195,606 | 4/1980 | Wallis et al. | 123/119 E |

FOREIGN PATENT DOCUMENTS 2317024 10/1974 Fed. Rep. of Germany.

OTHER PUBLICATIONS

A Comprehensive Treatise On Inorganic & Theoretical Chemistry, by J. W. Mellor, vol. 2, p. 148, Longmans, Green & Co. 1946.
Inorganic Chemistry, by Alan G. Sharpe, p. 216, Longman, 1981.
"Selective Laser Photocatalysis of Bromine Reactions", by W. B. Tiffany et al. Science, vol. 157, pp. 40–43, 1967.

Primary Examiner—John Doll
Assistant Examiner—Jeffrey Edwin Russel
Attorney, Agent, or Firm—Parkhurst & Oliff

[57] ABSTRACT

The invention relates to a process for initiating a reaction for the manufacture of synthetic hydrochloric acid, wherein two reactive gaseous chemical compounds, chlorine and hydrogen, are brought together. The molecules of at least one of said compounds are then excited by projection of a laser ray onto this reactive compound, wherein the laser ray is directed onto the zone where the two reactive compounds are brought together.

9 Claims, 2 Drawing Figures

PROCESS FOR INITIATING A REACTION FOR THE MANUFACTURE OF SYNTHETIC HYDROCHLORIC ACID

The present invention relates to a process for initiating the reaction of manufacture of synthetic hydrochloric acid by a laser ray.

In the industrial synthesis of hydrochloric acid, the energy of initiation brought onto a molecule of chlorine produces a chlorine radical, which then reacts with hydrogen to form a molecule of hydrochloric acid and simultaneously produce another hydrogen radical which, in turn, reacts on a molecule of chlorine to yield hydrochloric acid and produce another chlorine radical.

The reaction is as follows:

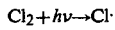

$h\nu$ designating the outside energy brought by photons, then

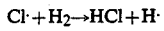

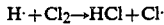

This reaction having started up, and if the temperature is sufficient, is then self-promoted in accordance with the scheme of a chain reaction.

Up to the present time, in order to initiate this reaction, it has been the practice to use an ignition member to bring the energy necessary for starting the reaction. A hand torch, which is most often used, is introduced into the mixture chamber. This is a mechanical and dangerous technique.

An auxiliary burner, particularly employing propane or another gas, is also used, which, once the reaction has been initiated, is withdrawn. Unfortunately, this solution poses not only mechanical problems since operation is carried out in a corrosive medium, but in addition can create problems concerning the air tightness of the reaction chamber.

U.S. Pat. No. 4,012,301 discloses a process for initiating and promoting a chemical reaction, particularly for the manufacture of methane, by excitation of a mixture of gaseous chemical compounds ($CO + H_2$) by means of a laser ray. To this end, the reaction chamber must be at a high pressure (20 to 100 atmospheres), which necessitates suitable, therefore expensive, equipment and the reaction must be constantly maintained with mixture and laser ray. This technique is not adaptable to the manufacture of synthetic hydrochloric acid, since there would be a considerable risk of explosion as the hydrogen-chlorine mixture in a wide ragne of proportions is explosive (cf. also U.S. Pat. No. 4,147,602).

The present invention overcomes these drawbacks. It relates to a process for initiating a reaction for the manufacture of synthetic hydrochloric acid, which is economical, each to carry out even in a corrosive medium, which may be used in an air tight medium, and in which the risks for the explosion are considerably reduced.

This process for initiating the reaction of manufacture of synthetic hydrochloric acid, wherein two reactive gaseous chemical compounds, chlorine and hydrogen, are brought together then the molecules of at least one of said compounds are excited by projection of a laser ray onto this reactive compound is characterized in that the laser ray is directed onto the very zone where the initial mixture of the two reactive compounds is effected.

"Zone of mixture" is understood to mean the zone where the reactive gases are brought into initial contact in order to subsequently form a homogeneous mixture in which the chemical reaction is self-promoted.

The laser ray is advantageously directed to the very point where this initial mixture is effected.

In practice:

the wave length of the absorption band of the molecules of the reactive compound (chlorine or hydrogen) and the wave length of the laser beam are similar, their difference being 15% at the most;

the laser beam is focussed;

the reactive compounds (chlorine and hydrogen) are supplied at flowrates of which the volume ratio is similar to that necessary for obtaining a stoichiometric mixture;

the laser beam is projected onto an obstacle placed in the zone of mixture of the reactives, preferably on a graphite plate.

It has been observed that a mixture of chlorine and of hydrogen excited by the same laser ray, focussed or not, gave rise to a chain reaction which is difficult to control and which may even lead to an explosion.

The invention will be more readily understood on reading the following description with reference to the accompanying drawings, in which.

Figure 1:
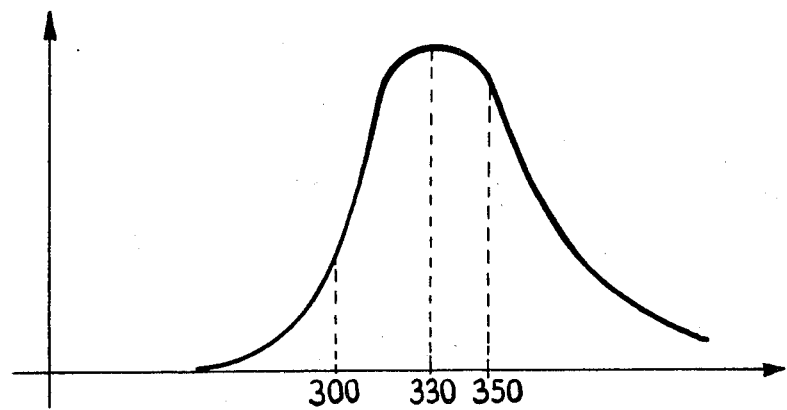
FIG. 1 shows part of the spectrum of absorption of chlorine with, on the x-axis, the wave length in nanometers and, on the y-axis, a magnitude representative of the energy absorbed by the molecule.

Referring now to the drawings, and firstly to FIG. 1, it may easily be determined that the optimum wave length of absorption is close to 330 nanometers.

Figure 2:
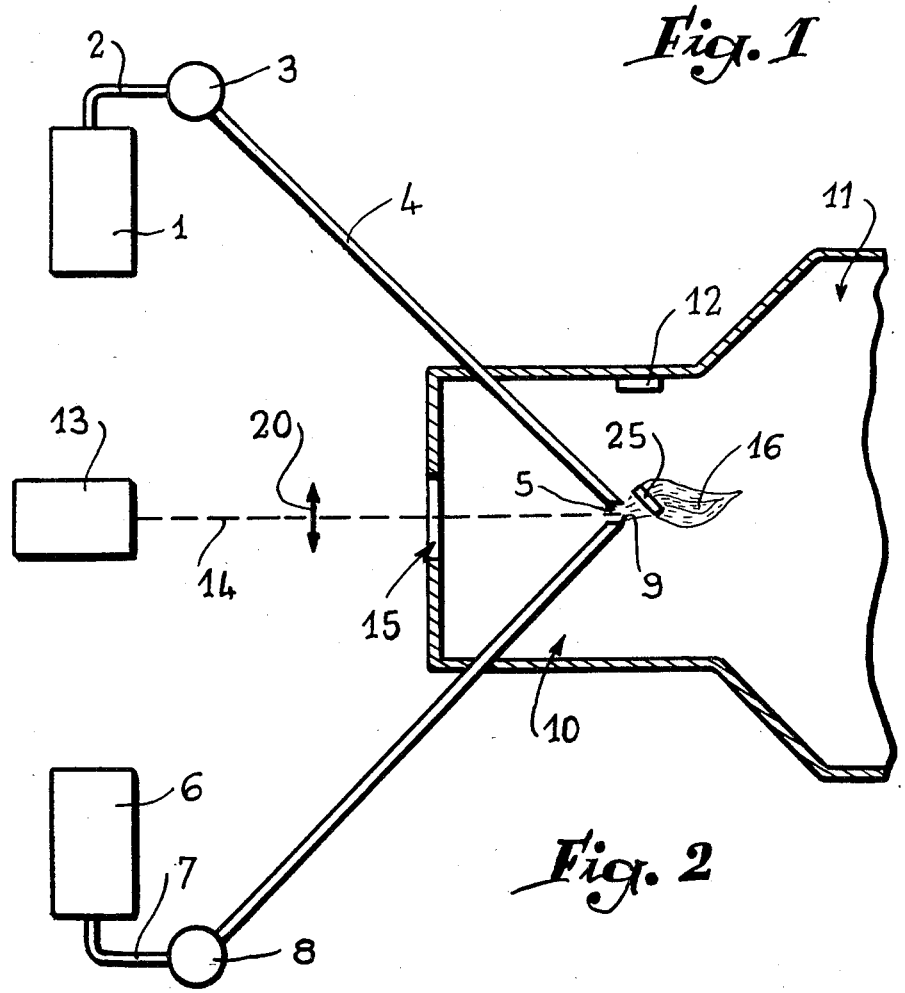
FIG. 2 is a summary representation of a device according to the invention.

The device according to the invention, shown in FIG. 2, essentially comprises a first source 1 of hydrogen, connected by a pipe 2 to a flowmeter 3 itself connected to a tube 4, through which the hydrogen enters the mixture chamber 10 at 5.

In parallel, a source 6 of chlorine is conencted by a pipe 7 to a flowmeter 8, itself connected to a tube 9 opening into the same mixture chamber 10. This mixture chamber 10 is connected in known manner to a reactor 11. The device may also comprise, in known manner, flame monitoring members 12.

A laser ray generator 13 emits a laser ray 14 which is directed into the mixture chamber 10 through an appropriate orifice 15, such as a quartz part permeable to this ray 14.

EXAMPLE 1

A pulsed nitrogen laser 13 emits a ray 14 having a wave length of 337 nanometers and emits an energy of one milli joule by impulsion. The flowrates (3) and (8) are regulated at 140 liters/hour at atmospheric pressure. The laser ray 14 arrives exactly between the two outlet orifices 5 and 9 at the point of convergence of the hydrogen 1 and the chlorine 6, therefore at the precise spot where the initial mixture of the two reactive gases is effected. As soon as the flowmeters are opened and the laser pulse 14 is sent, the chlorine-hydrogen reaction is initiated, which is translated by a self-promoted flame 16 of about four centimeters.

EXAMPLE 2

The preceding Example is repeated, but replacing the nitrogen laser 13 by an excimer (exciplex) laser of which the wave length is 308 nanometers, emitting an energy of 100 milli joules by impulsion. Thanks to a quartz lens 20, this ray is focussed on the mixture chamber 10. A self-promoted flame 16 of about three centimeters is obtained.

EXAMPLE 3

Example 1 is repeated, focussing the laser ray by a quartz lens 20.

The initiation of the reaction is effected with volume flowrates of reactives different from the stoichiometry: chlorine 140 1/hr., hydrogen 100 1/hr.

EXAMPLE 4

Example 3 is repeated, but placing, five centimeters after the point of convergence of the mixture, an inclined graphite plate 25 to allow passage of the gases, on which the laser ray 14 is focussed. The focussing of the laser ray in the zone of mixture may thus be less precise.

The process of initiation of the reaction of manufacture of synthetic hydrochloric acid according to the invention presents numerous advantages over those known heretofore. For example:

easy to carry out, even in a corrosive medium;
absence of mechanical parts, therefore of wear;
possibility of conveniently producing air tight reactors, and therefore possibly under pressure, under increased safety conditions.

What is claimed is:

1. A process for initiating a self-promoting reaction for the manufacture of synthetic hydrochloric acid, comprising:
   (a) supplying molecules of reactive chlorine gas and hydrogen gas to a zone of mixture where said reactive gases are brought together to form a homogeneous mixture, said chlorine molecules having an absorption band frequency and an absorption band wavelength; and
   (b) exciting said chlorine molecules by directing a laser pulse onto said zone of mixture, thereby initiating the self-promoting reaction for the manufacture of synthetic hydrochloric acid.

2. The process of claim 1, wherein the reactive gases are supplied at volume flowrates necessary for obtaining a stoichiometric mixture.

3. The process of claim 1, wherein said laser pulse is projected onto an obstacle placed in the zone of mixture of the reactive gases.

4. The process of claim 3, wherein the obstacle is a graphite plate.

5. A process for initiating a self-promoting reaction for the manufacture of synthetic hydrochloric acid, comprising:
   (a) supplying molecules of reactive chlorine gas and hydrogen gas to a zone of mixture where said reactive gases are brought together to form a homogeneous mixture, said chlorine molecules having an absorption band frequency and an absorption band wavelength; and
   (b) projecting a laser pulse onto said zone of mixture, said laser pulse having a wavelength within 15% of the absorption band wavelength of said chlorine molecules, thereby exciting said chlorine molecules and initiating the self-promoting reaction for the manufacture of synthetic hydrochloric acid.

6. A process for initiating a self-promoting reaction for the manufacture of synthetic hydrochloric acid, comprising:
   (a) supplying molecules of reactive chlorine gas and hydrogen gas to a zone of mixture where said reactive gases are brought together to form a homogeneous mixture, said chlorine molecules having an absorption band frequency and an absorption band wavelength; and
   (b) projecting a laser pulse onto said zone of mixture, said laser pulse having a frequency corresponding to said frequency of the absorption band of said chlorine molecules, thereby exciting said chlorine molecules and initiating the self-promoting reaction for the manufacture of synthetic hydrochloric acid.

7. A process according to claim 6, wherein both chlorine and hydrogen are supplied at volume flowrates necessary for obtaining a stoichiometric mixture.

8. A process according to claim 6, wherein said laser pulse is projected onto an obstacle placed in said zone of mixture.

9. A process according to claim 8, wherein said obstacle is a graphite plate.

* * * * *